S. R. BRAINARD.
MOTOR VEHICLE.
APPLICATION FILED MAR. 12, 1908.

912,798.

Patented Feb. 16, 1909.
2 SHEETS—SHEET 1.

WITNESSES:
H. B. Burr.
Ila Haydank.

INVENTOR
S. R. Brainard
BY
G. C. Kennedy
ATTORNEY

UNITED STATES PATENT OFFICE.

SHUBAEL R. BRAINARD, OF EAST WATERLOO TOWNSHIP, BLACKHAWK COUNTY, IOWA.

MOTOR-VEHICLE.

No. 912,798.    Specification of Letters Patent.    Patented Feb. 16, 1909.

Application filed March 12, 1908. Serial No. 420,641.

*To all whom it may concern:*

Be it known that I, SHUBAEL R. BRAINARD, a citizen of the United States of America, and a resident of East Waterloo township, Blackhawk county, Iowa, have invented certain new and useful Improvements in Motor-Vehicles, of which the following is a specification.

Figure 1:
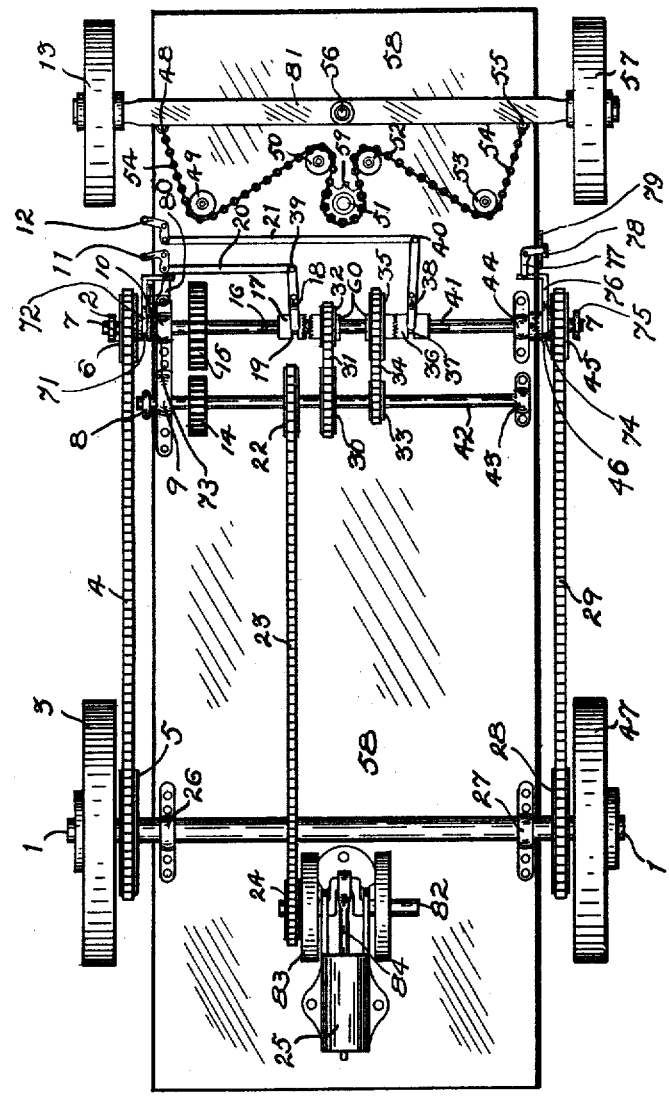
Figure 2:
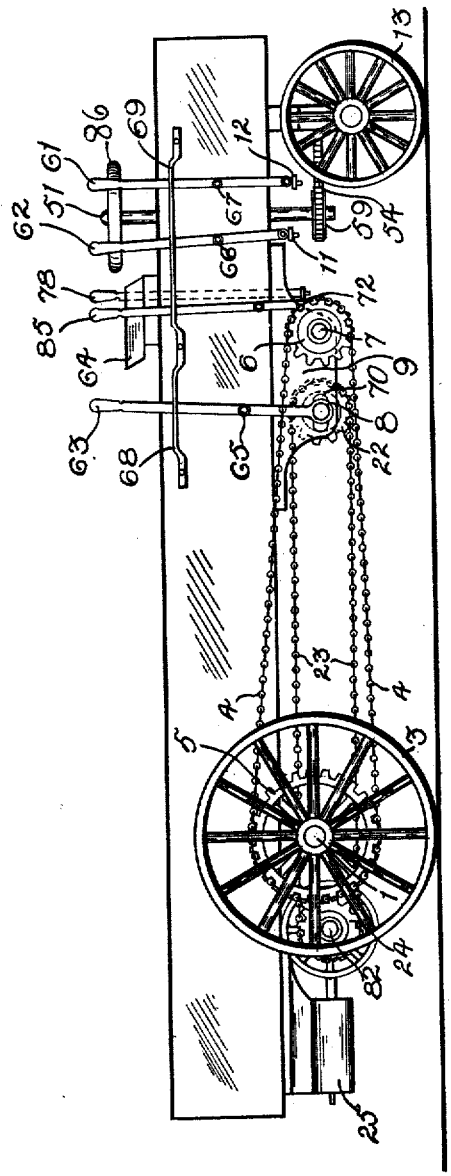

My invention relates to improvements in motor-vehicles, and the object of my improvements is to furnish simple, inexpensive and effective means for driving such vehicles as farm wagons, or other load-carrying vehicles. This object I have accomplished by the mechanism which is hereinafter fully described and claimed, and which is illustrated in the accompanying drawings, in which:

Figure 1 is an under plan view of a wagon and my improved mechanism for driving same. Fig. 2 is a right-hand side elevation of the same.

Similar numbers refer to similar parts throughout the several views.

The wagon-box 58 is supported at the rear on an axle 1 rotatable in bearings 26 and 27, the carrying-wheels 3 and 47 being secured to the right- and left-hand ends of said axle respectively. The forward end of the wagon-box is supported on the carrying-wheels 13 and 57 rotatable on an axle 81 which is centrally pivoted at 56. The axle 81 may be turned in either direction by means of the rocking to either side of a hand-wheel 86 on a vertical shaft 51, the lower end of said shaft passing through the wagon-box and bearing a sprocket-wheel 59.

The numerals 49, 50, 52 and 53 designate idlers pivoted to the under side of the wagon-box. A sprocket-chain 54 is led about the sprocket-wheel 59, and the said idlers as shown in Fig. 1, and its right and left ends respectively are secured to fastenings 48 and 55 on and near the ends of the axle 81.

Motive power for driving the vehicle is derived from an engine 25 secured under the rear of the wagon-box, and whose pitman 84 drives the crank-shaft 82, its fly-wheels 83, and the driving-sprocket wheel 24.

The numerals 42 and 7 designate auxiliary rotatable shafts transverse to and supported under the wagon-box toward the forward end of said box, but in the rear of the front carrying-wheels. The shaft 42 has its left-hand end rotatable in an ordinary fixed bearing 43, but its right-hand end is rotatable and slidable as well longitudinally of the vehicle in a bearing-box 9 and in its oblong bearing-opening 70. A hand-lever 63 is medially pivoted to the right-hand side of the wagon-box on a stud 65, and its lower end has a bearing orifice to receive the projecting right-hand end of the shaft 42, the latter being rotatable in the orifice. The hand-lever 63 works within a rack-bar 68 to limit its forward and back movement.

The shaft 7 is rotatable in fixed bearing-boxes 10 and 44, and its ends project a considerable distance beyond such boxes on either side, and have secured thereon the terminal collars 2 and 75 respectively. On the right- and left-hand ends of the shaft 7 the sprocket-wheels 6 and 45 respectively are rotatably mounted and are slidable also longitudinally along the shaft. Each of said sprocket-wheels has an inwardly-projecting hub having outer peripheral bearing-grooves 71 and 74 respectively, adapted to receive the tines of forks 72 and 76. The inner faces of each of said hubs is dentated to fit the corresponding dentations of the clutches 73 and 46 respectively, the latter secured to said shaft 7. Sprocket-chains 4 and 29 operatively connect the sprocket-wheels 5 and 6, and 28 and 45 respectively on opposite sides of said wagon-box. The sprocket-wheels 5 and 28 are fixed respectively to the left- and right-hand ends of the rear axle 1. The forks 72 and 76 are transversely shifted by means of hand-levers 78 and 85 respectively medially pivoted to opposite sides of said wagon-box, and whose lower ends are pivoted to levers 77 and 80 medially pivoted to said box and to the adjacent forks 76 and 72 respectively. The levers 78 and 85 work to engage grooves in their rack-bars 79 for two positions. In one station as depicted in Fig. 1, the levers shift both sprocket-wheels so as to leave them both engaged with their clutches, causing an associated driving action of said wheels on the chains 4 and 29. If it is desired to turn a corner in either direction, one of said levers is shifted to disengage its connected sprocket-wheel from the clutch, which permits the carrying-wheel on that side to run free from the motor connections, to allow for the difference in speed of rotation of said carrying-wheel, when the latter is turning on the outer and larger curve. Both of said levers may be shifted to disengage the sprocket-wheels from the clutches when it is desired to bring the vehicle to a stop.

In order to reverse the action of the sprocket-wheels 6 and 45, I have provided the following device. When by reason of the disengagement of said wheels from their clutches 73 and 46 respectively the vehicle has been brought to a stop, they are then again put into engagement with their clutches by means of the movement of the hand-levers 78 and 85. A pinion 14 is secured to the shaft 42 in a position to engage with a gear-wheel 15 on the shaft 7 when the hand-lever 63 has been shifted to move the shaft 42 forwardly. When the vehicle has been brought to a stop, in the manner above set forth, the lever 63 is shifted backward, which shifts the shaft 42 forward, so that said pinion and gear-wheel intermesh, the former then imparting to the latter, its shaft and the sprocket-wheels 6 and 45, the sprocket-wheels 5 and 28 through the intermediate chains 4 and 29, a rearward rotation. This rearward rotation is brought to a stop by merely shifting forward the lever 63 to disengage the said pinion and gear-wheel, and then throwing the sprocket-wheels 6 and 45 out of engagement with their clutches.

I have devised suitable means for changing the speed of said vehicle in its forward movement, as follows: To the shaft 42 are secured the sprocket-wheels 30 and 33, the former of greater diameter than the latter. Sprocket-chains 31 and 34 connect these wheels respectively with idler sprocket-wheels 32 and 35 on the shaft 7, the wheel 32 being smaller than the wheel 35, while conversely the wheel 32 is smaller than the wheel 30, and the wheel 33 than the wheel 35. The numerals 17 and 36 designate clutches which are slidable over feathers 16 and 41 respectively on the shaft 7, but are not rotatable on said shaft. The inner faces of the said clutches are dentated to fit within the interspaces of counterpart dentations on the outer faces of the hubs of the sprocket-wheels 32 and 35 respectively. Movement of the sprocket-wheels 32 and 35 in one direction each is limited by collars 60 secured to said shaft 7. A pivoted fork 18 has its tines engaging a peripheral groove 19 in the clutch 17, while a pivoted fork 38 has its tines engaging a similar groove 37 in the clutch 36. The forward members of said forks are pivoted at 39 and 40 respectively with links 20 and 21, respectively. The outer ends of the latter are pivoted respectively to the inner members of bell-crank levers 11 and 12, and the outer members of said bell-crank levers are pivoted to the lower ends of the hand-levers 62 and 61 respectively, the latter being medially pivoted at 66 and 67 respectively to the right-hand side of the box 58. By means of said hand-levers, the clutches 17 and 36 are kept shifted out of engagement with the idler wheels 32 and 35, until it is desired to put the vehicle in motion forward, when either lever may be shifted to cause its connected clutch to engage the sprocket-wheel desired in order to obtain a greater or less speed from the shaft 42. When changing speed, the clutch in engagement must be first shifted out of engagement, before throwing the other clutch into engagement by means of the other hand-lever.

My improved motive mechanism may be used to drive not only loaded farm wagons, but any description of heavy vehicle, traction-engine, manure-spreader or thresher, by slightly varying and adapting the same in position and arrangement to suit the purpose.

Having described my invention, what I claim as new, and desire to secure by Letters Patent, is:

1. A motor-vehicle, comprising, in combination, means for propelling the vehicle, embracing an engine, an engine-shaft, a sprocket-wheel on the engine-shaft, a rotatable transverse shaft parallel to said engine-shaft, one end of which is slidably mounted longitudinally of the vehicle, means for shifting the position of the slidable end of said shaft, a second rotatable transverse shaft parallel to the first mentioned shaft only when the latter is in a certain position of longitudinal adjustment, gear-wheels secured to each of the said last-mentioned shafts and adapted to intermesh only when the first-mentioned transverse shaft has its slidable end shifted in one direction, a sprocket-wheel secured to the first-mentioned transverse shaft, an idler sprocket-wheel rotatable and slidable on said second-mentioned transverse shaft and provided with a clutch surface on one end of its hub, means for limiting the slidable movement of said idler in one direction, a sleeve slidable but non-rotatable on the last-mentioned shaft and having a clutch-surface on one end adapted to engage the clutch surface on the said idler, means for shifting said sleeve into engagement with said idler, a sprocket-chain connecting the said idler and the sprocket-wheel aforesaid on the first-mentioned transverse shaft, a second sprocket-wheel secured to said first-mentioned transverse shaft, a sprocket-chain connecting the last-mentioned sprocket-wheel on the engine-shaft, rear carrying-wheels, a rotatable axle with its ends secured to said carrying-wheels, a sprocket-wheel secured to said axle, a sprocket-wheel secured to the said second-mentioned shaft, and a sprocket-chain connecting the two last-mentioned sprocket-wheels.

2. A motor-vehicle, comprising in combination, means for propelling the vehicle embracing an engine, an engine-shaft, a sprocket-wheel on the engine-shaft, a rotatable transverse shaft parallel to said engine-shaft, one end of which is slidably mounted longitudinally of the vehicle, means for shifting the position of the slidable end of said shaft, a second rotatable transverse shaft parallel to the first-mentioned shaft only when the latter is in a certain position of longitudinal adjustment, gear-wheels secured to each of the said last-mentioned shafts and adapted to intermesh only when the first-mentioned transverse shaft has its slidable end shifted in one direction, two idler sprocket-wheels of different diameters slidable and rotatable on the second transverse shaft, separate means for limiting the longitudinal movement of each idler in one direction, separate clutch-collars slidable but non-rotatable on said second transverse shaft, independent means for shifting each clutch into engagement with its companion idler to cause thereby the engaged idler to rotate its shaft, two sprocket-wheels of different diameters secured to the first mentioned transverse shaft, the large sprocket-wheel on the first shaft being opposite the small idler on the second shaft and the small sprocket-wheel on the first shaft being opposite the large idler on the second shaft, sprocket-chains connecting each pair of oppositely located sprocket-wheels, a sprocket-wheel secured to the first-mentioned transverse shaft, a sprocket-chain connecting the last mentioned sprocket-wheel and the sprocket-wheel on the engine-shaft, rear carrying-wheels, a rotatable axle with its ends secured to said carrying-wheels, a sprocket-wheel secured to said axle, a sprocket-wheel secured to the second-mentioned transverse shaft, and a sprocket-chain connecting the two last-mentioned sprocket-wheels.

3. A motor-vehicle, comprising in combination, means for propelling the vehicle embracing an engine, an engine-shaft, a sprocket-wheel on the engine-shaft, a rotatable transverse shaft parallel to said engine-shaft, one end of which is slidably mounted longitudinally of the vehicle, means for shifting the position of the slidable end of said shaft, a second rotatable transverse shaft parallel to the first-mentioned shaft only when the latter is in a certain position of longitudinal adjustment, gear-wheels secured to each of the said last-mentioned shafts and adapted to intermesh only when the first-mentioned transverse shaft has its slidable end shifted in one direction, a sprocket-wheel secured to the first-mentioned transverse shaft, an idler sprocket-wheel rotatable and slidable on said second-mentioned transverse shaft and provided with a clutch-surface on one end of its hub, means for limiting the slidable movement of said idler in one direction, a sleeve slidable but non-rotatable on the last-mentioned shaft and having a clutch-surface on one end adapted to engage the clutch-surface on the said idler, means for shifting said sleeve into engagement with said idler, a sprocket-chain connecting the said idler and the sprocket-wheel aforesaid on the first-mentioned transverse shaft, a second sprocket-wheel secured to said first-mentioned transverse shaft, a sprocket-chain connecting the last-mentioned sprocket-wheel and the sprocket-wheel on the engine-shaft, rear carrying-wheels, a rotatable axle with its ends secured to said carrying-wheels, a sprocket-wheel secured to each end of said axle, idler sprocket-wheels slidable and rotatable on the ends of said second-mentioned shaft, independent means for limiting the movement of each of said idlers in one direction, independent clutch-collars on said shaft slidable but non-rotatable thereon and each adapted to so engage its companion idler as to cause the latter to rotate with the shaft, means for shifting the said clutch-collars into or out of engagement with said idlers respectively, and sprocket-chains connecting said idlers with the sprocket-wheels on the same side on the ends of said rotatable axle.

Signed at Waterloo, Iowa, this 21st day of Feb., 1908.

SHUBAEL R. BRAINARD.

Witnesses:
O. D. YOUNG,
G. C. KENNEDY.